(12) United States Patent
Gassmann

(10) Patent No.: US 6,851,501 B2
(45) Date of Patent: Feb. 8, 2005

(54) FULL TIME ALL WHEEL DRIVE SYSTEM

(75) Inventor: Theodor Gassmann, Siegburg (DE)

(73) Assignee: GKN Driveline North America, Inc.

( * ) Notice: Subject to any disclaimer, the term of this patent is extended or adjusted under 35 U.S.C. 154(b) by 0 days.

(21) Appl. No.: 09/845,657

(22) Filed: Apr. 30, 2001

(65) Prior Publication Data

US 2003/0004027 A1 Jan. 2, 2003

(51) Int. Cl.[7] .............................................. B60K 17/348
(52) U.S. Cl. ........................ 180/248; 475/204; 475/221
(58) Field of Search ................................ 180/247, 248, 180/249, 250, 233; 475/221, 204, 206, 205, 203, 225, 198

(56) References Cited

U.S. PATENT DOCUMENTS

| | | | | |
|---|---|---|---|---|
| 1,497,845 A | * | 6/1924 | Evans ......................... | 475/204 |
| 4,592,442 A | * | 6/1986 | Wilson et al. ............... | 180/247 |
| 4,750,382 A | * | 6/1988 | Marc ............................ | 475/85 |
| 4,761,043 A | * | 8/1988 | Wupper et al. ............. | 303/190 |
| 4,763,747 A | * | 8/1988 | Muller ........................ | 180/244 |
| 4,911,260 A | * | 3/1990 | Miura et al. ................ | 180/249 |
| 5,904,634 A | * | 5/1999 | Teraoka ....................... | 475/231 |
| 6,117,038 A | * | 9/2000 | Nishiji et al. ............... | 475/221 |

FOREIGN PATENT DOCUMENTS

JP  2-158425  *  6/1990

* cited by examiner

*Primary Examiner*—Anne Marie Boehler
(74) *Attorney, Agent, or Firm*—Mick Nylander; Jennifer Brumbaugh; Michael T. Raggio

(57) ABSTRACT

An all wheel drive system for use in a vehicle where that system includes a front axle having a front differential. The all wheel drive system also includes a center differential connected to the front differential via a prop shaft. The all wheel drive system also includes a rear axle having a rear differential wherein the rear differential is connected to the center differential. The rear differential having a reduction gear integrated therein.

10 Claims, 5 Drawing Sheets

FULL TIME ALL WHEEL DRIVE SYSTEM

TECHNICAL FIELD

The present invention generally relates to all wheel drive vehicles, and more particularly, relates to an all wheel drive vehicle with a reduction gear for a low range integrated within one of the axle differentials.

BACKGROUND ART

All wheel drive systems have been known for years in the motor vehicle industry. A typical type of all wheel drive vehicle is a full time auto engaging system wherein a fixed torque split of e.g., 50/50 between the front and rear axles is used. However, other torque splits such as 60/40, 70/30 or even 20/80 may be used. Most current all wheel drive systems have a center differential which provides the torque to the rear differential and front differentials, respectively. The center differential on prior art all wheel drive vehicles can be combined with a low range gear for use in off road driving and severe driving conditions. The low range gear in the transfer case of prior art devices provides extremely high torque to the wheels for heavy duty towing and hazardous driving conditions. Some of the all wheel drive prior art vehicles have also provided the low range gear as a shiftable planetary reduction gear that is integrated in the transfer case of the drive line system. The use of the planetary gear arrangement in the center differential generally requires an extended transfer case which creates a need for all wheel drive vehicles to have longer power trains that lead to increases of the noise, vibration and harshness of the vehicle along with packaging issues associated with such low range options.

The prior art all wheel drive systems that include low range gears also have to design all of the drive line components after the reduction gear to be sized for maximum load which leads to a high torque, high weight drive line, thus the need for specifically designed prop shafts, axles and side shafts for the drive line system. The prior art all wheel drive vehicles also have drive trains that may have transversal engine arrangements which restricts the amount of packaging for the transfer case which in some instances does not even allow for the integration of the low range option because of packaging restrictions with the engine arranged in such a manner. Furthermore, these prior art all wheel drive systems use the torque split between the front and rear axles for both on and off road usage, i.e., whether in the high gear or the low range gear, which is not conducive to optimum all wheel drive conditions in the low range option. The all wheel drive systems also tend to need forced lubrication for the low range permanent idling reduction gears which usually includes an oil pump which will increase the cost, complexity and losses in the transfer case of the all wheel drive system. The prior art all wheel drive systems can either be completely mechanical wherein the secondary driven axle is a hang on axle that is engaged when the primary driven axles slips and such slip is sent through a viscous coupling or other differential setup that engages the rear differential thus sending torque to the wheels that have the better grip in the road conditions. However, with the complexity of all wheel drive vehicles increasing there are also systems that electronically sense the slip on the individual wheels of the front axle and the rear axle and electronically engage the brakes on the slipping wheels to send power to the other wheels within the predetermined torque split. Many of these brake and traction controlled full time all wheel drive systems are left without the option of a low range because of the packaging issues and transversal engine arrangement found in a lot of the smaller SUV's.

Therefore, there is a need in the art for an all wheel drive system that includes a center differential and has a low range gear integrated in one of the drive axles. This will allow for a full time all wheel drive system to include a low range option in all vehicle configurations including transversal engines, etc.

BRIEF SUMMARY OF THE INVENTION

One object of the present invention is to provide an improved full time all wheel drive system for a vehicle.

Another object of the present invention is to provide a full time all wheel drive system with a center differential having a low range gear integrated in one of the drive axles.

Yet a further object of the present invention is to reduce the size of all drive line components before the low range integrated reduction gear.

Still a further object of the present invention is to have a smaller transfer case that is simple to design and repair with reduced packaging.

Still a further object of the present invention is to provide different torque splits in low and high range modes to the axles of the all wheel drive vehicle.

Still another object of the present invention is that the majority of the drive line components for the system will be the same regardless of if the drive line comes with or without a low range option.

Still a further object of the present invention is to provide an all wheel drive system where the low range gear does not idle in high range and therefore will not need forced lubrication and will not generate permanent losses.

To achieve the foregoing objects the all wheel drive system for use in a vehicle includes a front axle having a front differential. The all wheel drive system also includes a center differential connected to the front differential and a rear axle having a rear differential. The rear differential being connected to the center differential wherein the rear differential has a reduction gear integrated therein.

One advantage of the present invention is the new and improved full time all wheel drive system for a vehicle.

A further advantage of the present invention is that the full time all wheel drive vehicle has a center differential and a low range gear integrated in one of the drive axles.

A further advantage of the present invention is the down sizing of all drive line components before the reduction gear.

Still another advantage of the present invention is a smaller and simpler designed transfer case that has a reduced weight, packaging and losses.

Still a further advantage of the present invention is that the integrated low range gear in the axle will provide a variety of torque splits in low and high range which will better match different requirements for each gear.

Still a further advantage of the present invention is that a majority of the same drive line components can be used for a drive line even if the drive line does not include a low range option.

Still a further advantage of the present invention is that the low range gear does not idle in the high range gear and therefore does not need forced lubrication and does not generate permanent losses.

Other objects, features, and advantages of the present invention will become apparent from the subsequent description and appended claims taken in conjunction with the accompanying drawings.

BRIEF DESCRIPTION OF THE DRAWINGS

FIG. 5 shows a partial cross section of an axle according to an alternate embodiment of the present invention.

FIG. 6 shows a graph of tractive force versus gradient according to the present invention.

BEST MODE FOR CARRYING OUT THE INVENTION

Figure 1:
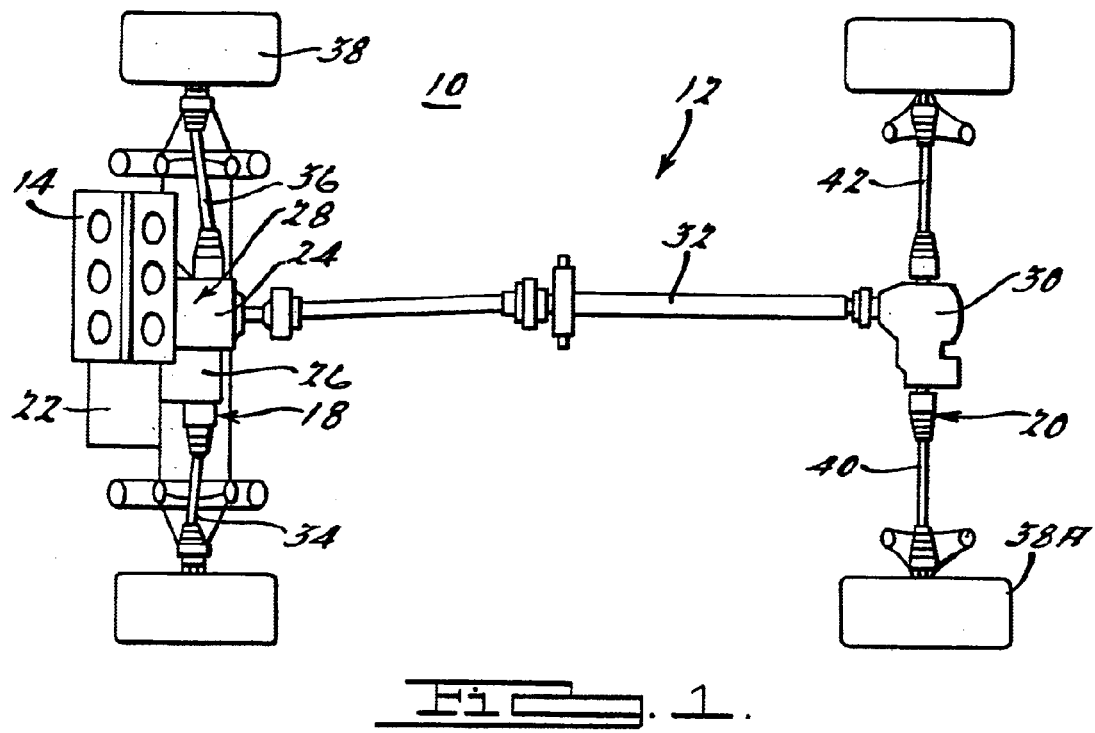
FIG. 1 shows a drive line layout according to the present invention with a transversal engine.
Figure 2:
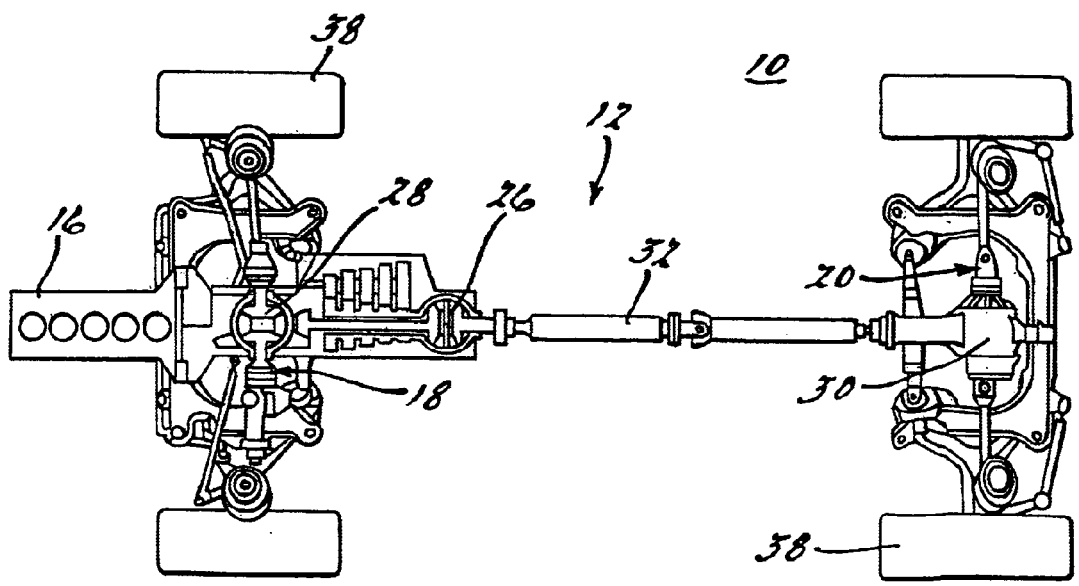
FIG. 2 shows a drive line layout according to the present invention with a longitudinal engine.
Figure 2:
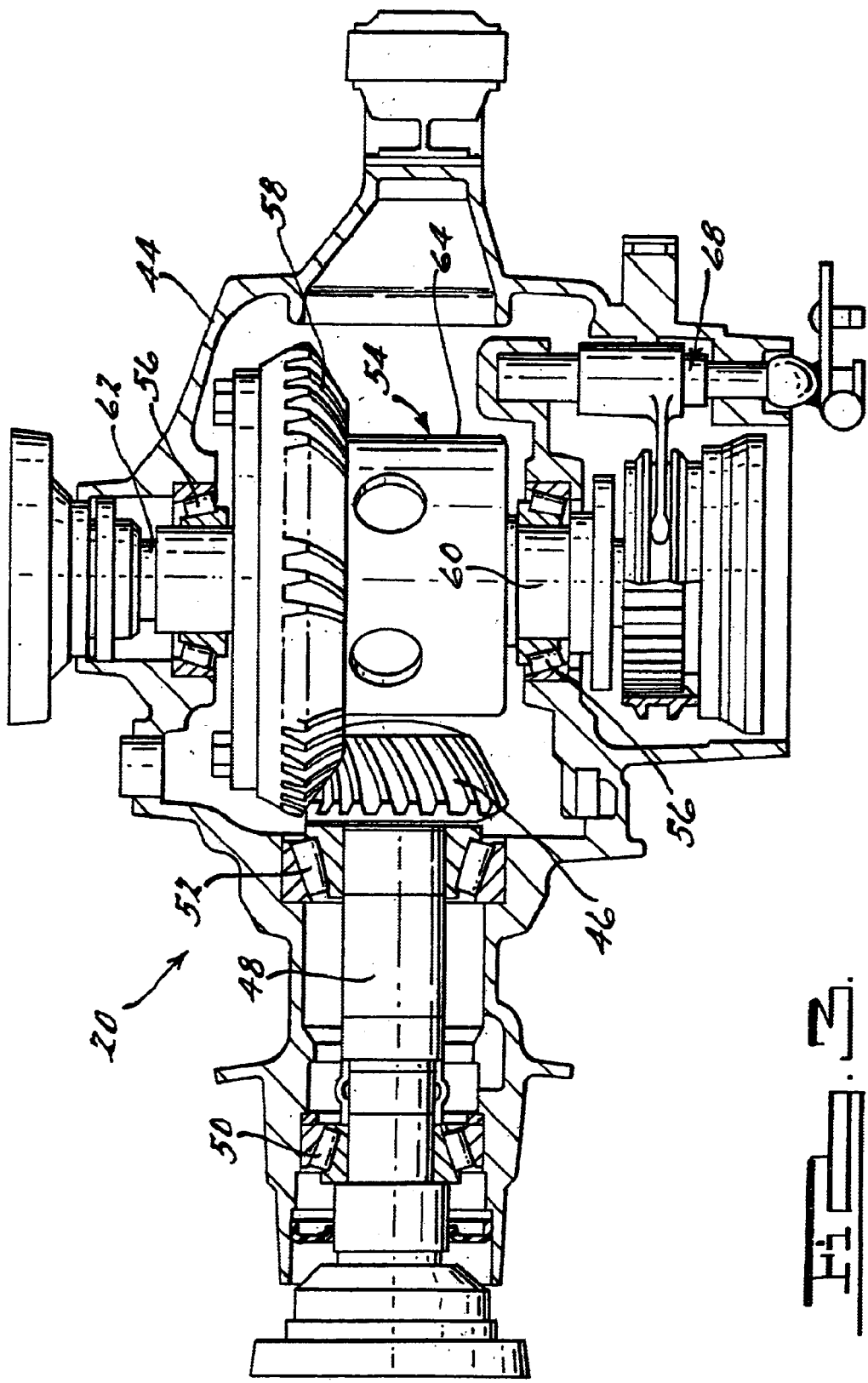

Referring to the drawings, a full time all wheel drive system 10 for a full time all wheel drive vehicle according to the present invention is shown. FIGS. 1 and 2 schematically illustrate an all wheel drive or four wheel drive motor vehicle 12 that has a transversal engine 14 or a longitudinal engine 16. In the preferred embodiment of the invention the front axle 18 is driven with 60% of the torque provided while the rear axle 20 has only 40% of the basic torque provided therein. However, it should be noted that the present invention can be used with various torque splits between front and rear.

FIG. 1 shows a motor vehicle that has 60% of its torque power provided to the front axle 18 while 40% of the torque power is provided to the rear axle 20 in its basic configuration. This all wheel drive vehicle or four wheel drive vehicle 12 is driven by power transferred from the engine 14 to a transaxle or gear box 22, which may be either an automatic or a manual gear box, into the power takeoff 24 of the drive train assembly and into a center differential 26 located in the power takeoff unit transmission. The center differential 26 will then distribute the torque to both the front differential 28 and the rear differential 30 via a propeller shaft or driving shaft 32. The basic torque split for an all wheel drive vehicle may be 60/40 with 60% of the torque going to the front axle 18 and 40% going to the rear axle 20 via the center differential 26. It should be noted that the rear differential 30, front differential 28 and center differential 26 are generally always open differentials within an all wheel drive system. At the front differential 28 the power is split to the left hand front side shaft 34 and a right hand front side shaft 36 for distribution to the wheels 38 at the front of the vehicle. The rear differential 30 receives power from the center differential 26 via the propeller shaft 32 and equally distributes the torque to the left hand rear side shaft 40 and the right hand rear side shaft 42.

In the preferred embodiment the present invention is an all wheel drive wherein the torque distribution has 60% of the basic torque delivered to the dominant front differential 28 while 40% is delivered to the rear differential 30 when the vehicle is in the high gear of the all wheel drive system. When slip is encountered on either the front wheels 38 or the rear wheels 38A of the present all wheel drive system the brake on the slipping wheels is engaged to maintain the torque transfer to the non-slipping axle in accordance to the basic torque split. Therefore, if the front wheels begin to spin on ice, snow or other slick road conditions the front brakes will be engaged and, the center differential 26 will transfer the remaining torque to the rear differential 30 in accordance with the basic torque split. FIG. 1 shows the drive line layout for a transversal engine 14 which is found in many modern day smaller off road vehicles. The transversal engine 14 provides the engine sideways under the hood of the vehicle and provides special needs for packaging of the transfer case and other drive line components. The center differential 26 is located directly adjacent to the transversal engine 14 in the power take off or in the transmission.

FIG. 2 shows a drive line layout having a longitudinal engine 16. The same components are used in the longitudinal engine 16 as these found in the transversal engine 14 and they include the center differential 26 which is connected via a prop shaft or drive shaft 32 to both the rear differential 30 and the front differential 28 of the vehicle. In the case of the longitudinally placed engine 16, the center differential 26 is located adjacent to the transmission and more toward the center point of the vehicle's body. The rear differential 30 of the transversal and longitudinal engines 14, 16 include a low range gear or reduction gear integrated within the rear axle 20. The front axle 18 uses commonly known parts and differential known throughout the industry and will not be specifically described.

Figure 3:
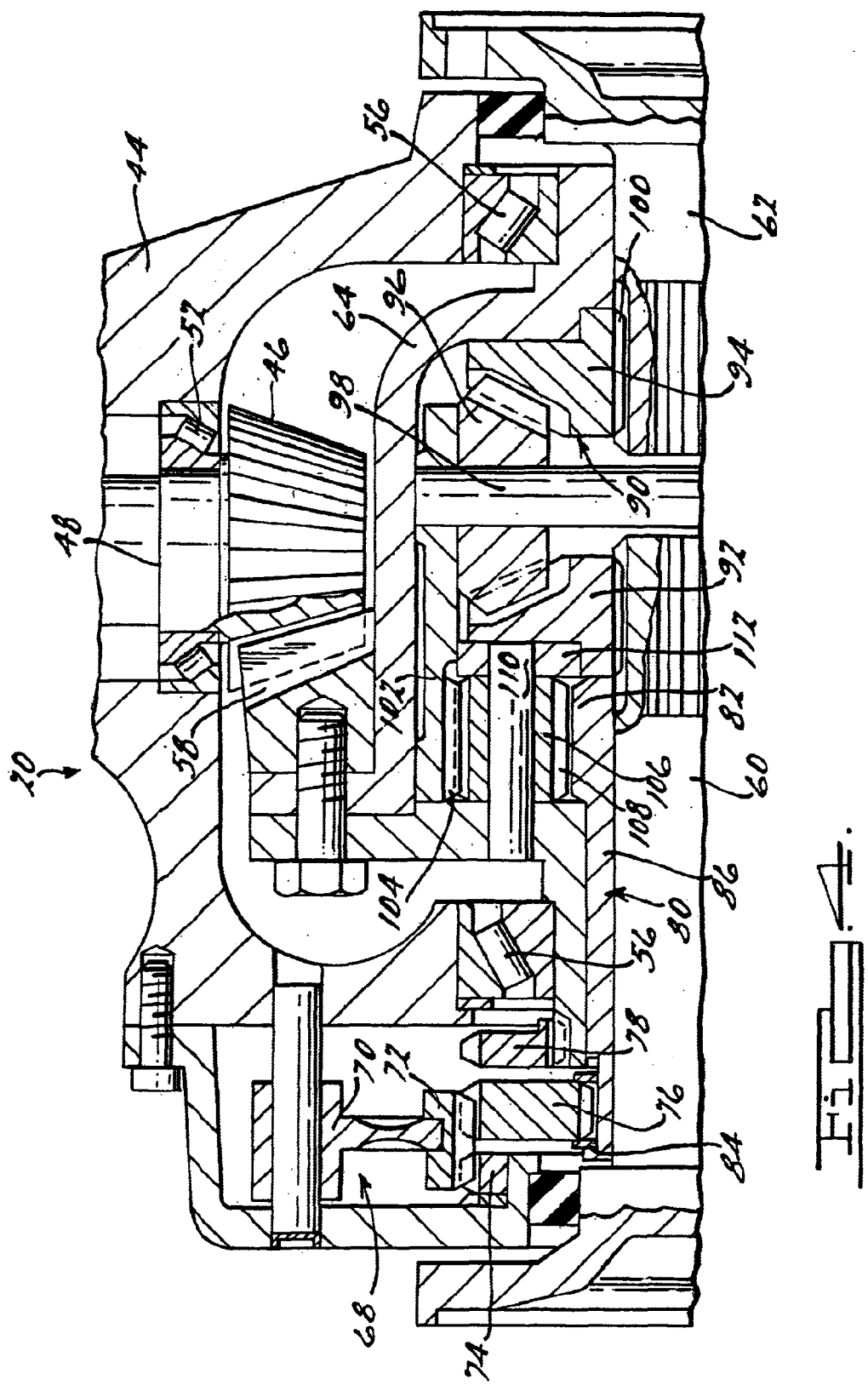
FIG. 3 shows an axle in cross section according to the present invention.

FIG. 3 shows a cross section of a rear axle 20 according to the present invention. The rear axle 20 generally includes an axle housing 44 which is supported on the frame of the vehicle. The axle housing 44 includes a pinion gear or driving gear and pinion shaft 48 which is directly connected to a prop shaft 32. The prop shaft 32 is also connected on the opposite end thereof to the center differential 26 and provides torque to the rear axle 20. The pinion shaft 48 is supported by a first and second set of bearings (50, 52). A differential 54 is rotatably supported, via bearings 50, within the rear axle housing 44. The differential 54 has a ring gear 58 on an outside surface thereof. The ring gear 58 meshes with the pinion gear 46 to provide the necessary torque to propel the rear wheels 38. A left hand side 60 and right hand side stub shaft 62 extend from the differential 54 and connect to the respective right hand rear side shaft 42 and left hand rear side shaft 40. The differential 54 generally includes a differential housing 64 and within that differential housing 64 is the integrated reduction gear 66 according to the present invention. The rear axle 20 also includes within its housing 44 a shift mechanism 68 which will engage a low range gear or a high range gear for the all wheel drive system. It should be noted that if the all wheel drive vehicle is a primary rear driven vehicle, then the rear axle will be a standard well known axle and the front axle housing will include the shift mechanism integrated within the differential housing of the front axle.

Figure 4:
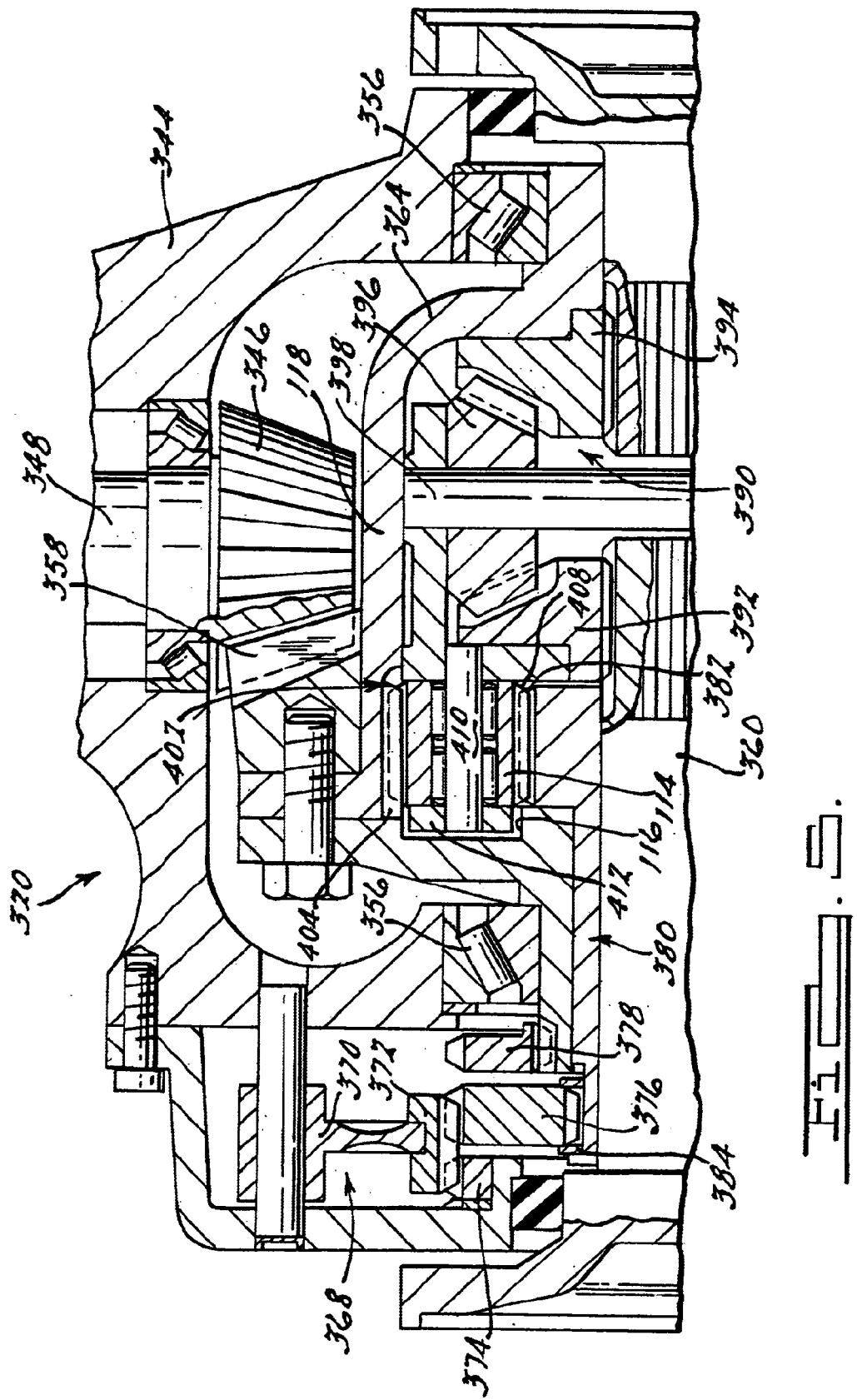
FIG. 4 shows a partial cross section of an axle according to the present invention.
Figure 8:
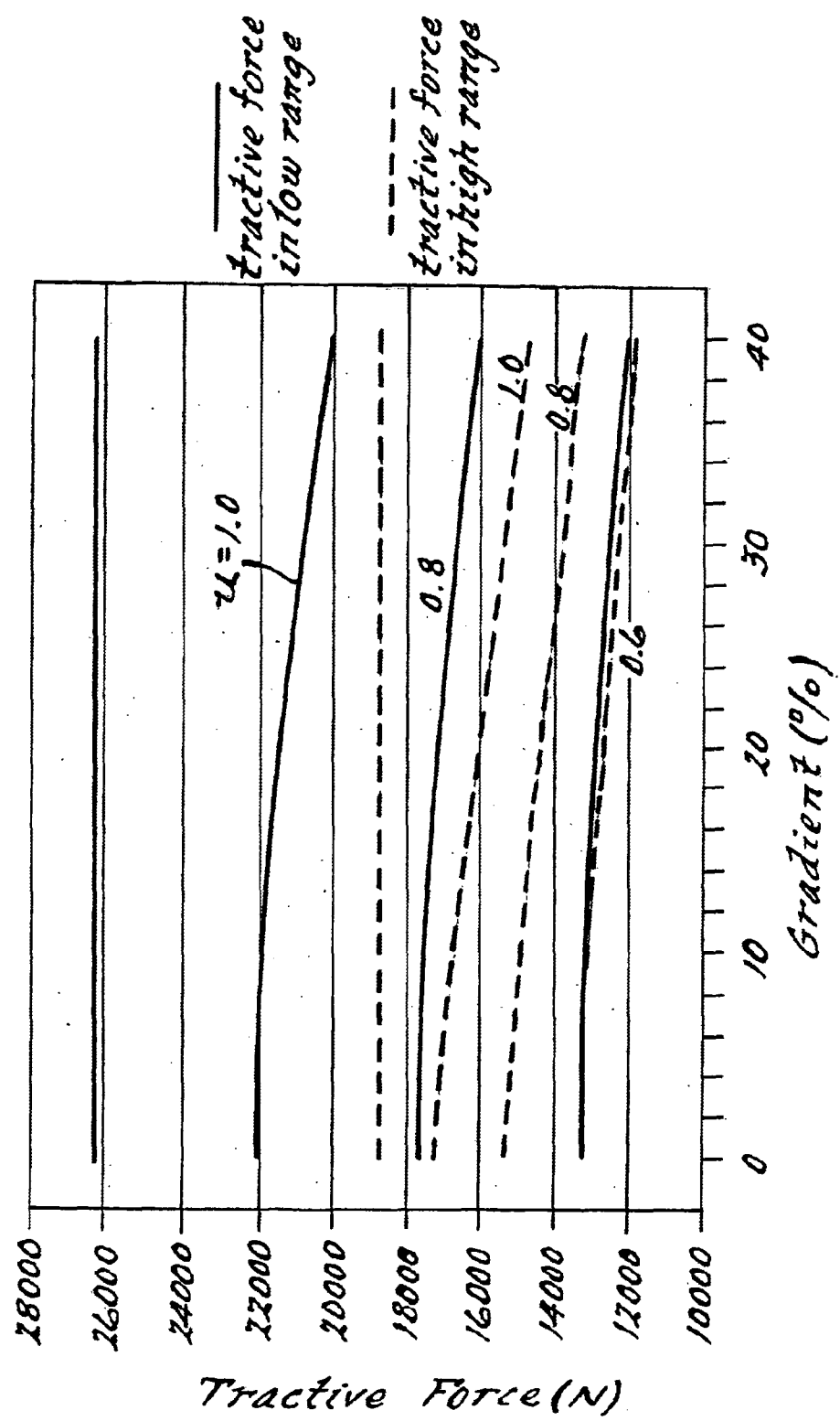

FIG. 4 shows a partial cross section of the axle lay out for the rear axle 20 in the preferred embodiment of the invention. The axle housing 44 rotatably supports the pinion shaft 48 and driving gear 46 connected to the end of the pinion shaft 48. The pinion shaft 48 is rotatably supported by a ball bearing 52 in contact with the axle housing 44. The driving gear 46 interacts and engages with the ring gear 58 which is attached to the differential housing 64 by any known securing means. The differential housing 64 is supported within the axle housing 44 by a first set of bearings 56 and a second set of bearings 56. A shift mechanism 68 is connected to the axle housing 44 and is controlled via mechanical links that are connected to an onboard system computer of the vehicle. The shift mechanism 68 in the preferred embodiment is a dog clutch. The dog clutch 68 has a shift lever 70 that is connected to an arm 72 that engages either a first tab 74 to a second tab 76 or a second tab 76 to a third tab 78. The first tab 74 is secured to the axle housing 44 while the third tab 78 is secured to the differential housing 64. The second tab 76 is secured to a sun gear 80 and shifts between contacting the first and third tabs 74, 78. The shift lever 70 moves the shift arm 72 to one of three predefined positions. The first is where the first tab 74 and the second tab 76 are secured to one another by the shift arm 72 and effectively locks the axle housing 44 to the sun gear. The second position is when the shift arm 72 only contacts the second tab 76 and in effect disconnects the rear axle 20 from the all wheel drive system. The third position is when the shift arm 72 connects the second tab 76 to the third tab 78 and connects the differential housing 64 to the sun gear 80. The stub shaft 60 of the rear axle 20, as shown in FIG. 4, has the sun gear 80 surrounding it. The sun gear 80 includes a plurality of teeth on both ends 82, 84 thereof. The plurality of teeth 82, 84 are connected by a long body portion 86. The sun gear 80 generally has a cylindrical shape. The differential housing 64 has a differential bevel gear set 90 rotatably supported therein. The differential gear set 90 includes a first 92 and second side gear 94 interacting and engaging with a first 96 and second pinion gear (not shown). A differential pin 98 is secured to the inside portion of the differential housing 64 and also has the pinion gears 96 rotatably connected thereto. The side gears 92, 94 of the differential 54 are connected via a series of teeth 100 to the stub shafts 60, 62 which extend out to the left hand rear side shaft 40 and the right hand rear side shaft 62. Adjacent to the inner surface of differential housing 64 is a hollow gear 102 which includes an orifice on one end thereof which receives the differential pin 98. On an end of the hollow gear 102 opposite of the orifice is located a plurality of teeth 104 on its inside circumference. The hollow gear 102 generally has a cylindrical shape with the plurality of teeth 104 on an inside circumference thereof. A double planet reduction gear 106 is in contact with the teeth of the hollow gear 102. It should be noted that a plurality of double planet reduction gears 106 are arranged around the circumference of the sun gear 80 and hollow gear 102. The double planet reduction gears 106 generally have a cylindrical shape with an orifice in the middle and a plurality of teeth 108 on the outer surface of the gear 106. In an alternating pattern a double planet reduction gear 106 engages the inner teeth 104 of the hollow gear 102 while the next adjacent double planet reduction gear 106 engages the plurality of teeth 82 of the sun gear 80. This alternating pattern of engaging the hollow gear teeth 64 and the sun gear teeth 82 is followed around the entire circumference of the double planet reduction gears 106. A planet pin 110 is located through the orifice of the double planet gear 106 and is connected to the differential housing 64 on one end thereof while the opposite end of the planet pin 110 is secured through a planet gear carrier 112. The planet gear carrier 112 generally has a ring like appearance with a plurality of orifices used to secure the plurality of planet pins 110 for each double planet reduction gear 106.

FIG. 5 shows an alternate embodiment of the present invention. The alternate embodiment includes the use of a single planet reduction gear instead of the double planet reduction gear 106 of the example described above. It should be noted that like numerals represent like parts with regard to the preferred embodiment. The rear axle 320 includes an axle housing 344 with a rotatably supported pinion shaft 348 that has a driving gear 346 which engages and powers the ring gear 358 connected to a differential housing 364. The axle housing 344 includes a shift mechanism 368 that has a shift lever 370 having a shift arm 372 which will engage with a first 374, second 376 or third tab 378. The first tab 374 is connected to the axle housing 374, while the second tab 376 is connected to a sun gear 380 and a third tab 378 is connected to the differential housing 364. The shift lever 370 is capable of moving such that the shift arm 372 engages the first 374 and second tab 376 to one another or the second 376 and third tab 378 to one another depending on the need for a high gear or low range gear in the all wheel drive vehicle. It should also be noted that the shift arm 372 may be placed in a disconnect position wherein only the second tab 376 is contacted by the shift arm 372 of the shift lever mechanism 368. The sun gear 380 has a plurality of teeth on the outer surface of both ends 382, 384 thereof, is placed around a stub shaft 368 of the rear axle housing 344. The sun gear 380 generally has a cylindrical shape with the plurality of teeth on both ends thereof connected by a long narrow body 386.

A differential housing 364 is rotatably supported within the axle housing 344 by a first set and a second set of bearings 356. The differential housing 364 also includes a notch 116 on an inside surface thereof. The differential housing 364 includes a differential gear set 390 that is rotatably supported within the differential housing 364. The differential gear set 390 includes a first 392 and a second side gear 394 and a first 396 and a second pinion gear. The differential gear set 390 also includes a differential pin 398 which is connected to an inside surface of the differential housing 364 and is also rotatably connected to the first 396 and second pinion gears. A hollow gear 402 is located on an inside surface of the differential housing 364 opposite of a ring gear 358 which is located on an outer surface of the differential housing 364. The ring gear 358 engages with the driving gear 346 to rotate the differential housing 364 within the axle housing 344. The hollow gear 402 has a plurality of teeth 404 located in a ring like manner on the inner surface of the differential housing 364. It should be noted that the hollow gear 402 may also be a separate gear and casing that is secured to the inner surface of the differential housing, not integral like the described gear.

A single planet reduction gear 114 is in contact with and engages the plurality of teeth 404 of the hollow gear and the plurality of teeth 382 of the sun gear within the differential housing. The single planet reduction gear 114 generally has a cylindrical shape with an orifice through the middle thereof. The outer surface of the single planet reduction gear 114 has a plurality of teeth 408 that mate with the hollow gear teeth 404 and the sun gear teeth 382. It should be noted that a plurality of single planet reduction gears 114 are located around the circumference of the sun gear 380. In the preferred embodiment a total number of eight single planet reduction gears are equidistantly spaced around the circumference around the sun gear 380, but it should be noted other quantities and arrangements of the gear may be used. Each of the plurality of the single planet reduction gears 114 has a planet pin 410 placed through the orifice of the single planet reduction gear 114. The planet pin 410 is secured to a planet gear carrier 412 on one end thereof. The planet gear carrier 412 is located within the notch 116 of the differential housing 364 and generally has a ring like appearance. The planet gear carrier 412 also includes a plurality of orifices through which the planet pins 410 are secured. The opposite end of the planet pin 410 is connected to an axle differential carrier 118 which generally has a L-shaped cross section. The axle differential carrier 118 includes a plurality of orifices that receive the planet pins 410 of single planet reduction gear 114. The axle differential carrier 118 also includes a radially positioned orifice that receives the differential pin 398 therein. The axle differential carrier 118 provides input force to the bevel differential gear set 390 of the rear differential housing 364.

In operation the all wheel drive system 10, that includes a reduction gear integrated in one of the axles provides that the torque in all of the drive line components, located in front of the reduction gear in the torque power flow, are designed for normal torque in a high range gear of the all wheel drive system. This torque is usually limited by the maximum engine torque available. The drive line components that are designed for this normal torque in high gear include the transfer case, the center differential 26, the front axle 18, the front differential housing 28, the front right hand side shaft 36, the front left hand side shaft 34, and the prop shaft 32 that connects the center differential 26 to the front axle 18. Furthermore, the prop shaft 32 that connects the center differential 26 to the rear axle 20 is also capable of being designed for normal torque power flow in the high gear position. Hence, in normal operation the basic torque split between the front axle 18 and rear axle 20 is 60/40 with the front axle receiving 60% of the torque and the rear axle receiving 40%. However, it should be noted that other basic torque splits that can be used are 50/50 front to rear and 40/60 with the front receiving 40% of the power. These basic torque splits are applied while in the high range mode or high gear of the all wheel drive vehicle. During any wheel slip in any of the front wheels or rear wheels 38 the appropriate torque will be sent to the axle that has a superior grip on the slippery road conditions. Once the slip condition is neutralized the basic torque split will be reapplied to the all wheel drive line. Therefore, any slip conditions encountered either due to slippery road conditions, such as snow, ice, mud or water and/or from turning of the vehicle, the outer wheels spin faster than the inner wheels, the center differential 26 will provide the necessary torque to the axle with the better grip and to the wheel with a better grip until straight line driving is encountered and the basic rate split ratio is resumed.

When the all wheel drive vehicle is selected to go into a low range or reduction gear mode, the operator is generally going off road with his vehicle and/or interested in towing a very large cargo. After the selection is made for the low range mode a reduction gear, i.e., either the double planet reduction gear 106 or in the alternate embodiment a single planet reduction gear 106, will reduce the speed and increase the torque on the rear axle 20. Hence, the rear prop shaft 32 will have to spin faster than the front prop shaft 32 to provide the same wheel speed. This difference between the rear and front prop shaft speeds is compensated in the center differential 26 which is permanently differentiating in the low range mode. Therefore, the low range mode reduction gear integrated in the rear axle 20 will only work in a permanent all wheel drive vehicle with a center differential 26. The higher rear axle torque while in the low range mode creates a change in the torque split between the front 18 and rear axles 20 to provide a more rear axle dominate split. Such examples of the torque split change are as follows.

| Embodiment | Reduction Gear Ratio | Basic Torque Split Front/Rear | | |
|---|---|---|---|---|
| | | 60/40 | 50/50 | 40/60 |
| Single Planet Reduction Gear | 1.6 | 48/52 | 38/62 | 30/70 |
| Double Planet Reduction Gear | 2.0 | 43/57 | 34/66 | 25/75 |

It should be noted that the low range ratio for the single planet reduction gear ratio can be anywhere between 1.5 to 1.7 but for the double planet arrangement the gear ratio could be anywhere between 2.0 to 2.2.

The arrangement of the reduction gear in the rear axle 20 will lead to the shift of the torque split to more rear dominate which is preferable in towing situations or off road conditions and will also better match the optimal torque distribution of an all wheel drive vehicle for traction. It should be noted that in the case of having the reduction gear arrangement in the front axle the effect will be just the opposite as shown above in the table by exchanging the front and rear splits.

As shown in FIGS. 4 and 5 the present invention has the reduction gear in the rear axle 320 in combination with an open bevel gear differential 354. In operation the reduction gear is arranged beside the axle bevel gear differential 390 inside the differential housing 364. The planet gears 114 are driven by the hollow gear 402 which is connected to part of the differential housing 364 in the single planet reduction gear 114. As shown in FIG. 5. The planet gear carrier 412 drives the axle differential carrier 118 which are input for the bevel differential gear 390. The shift lever 370 is used to either connect the sun gear 380 to the differential housing 364 which forces the planetary gear 114 to be the input or to move the shift arm 372 such that the axle housing 344 is connected to the sun gear 380 which provides for stationary input. If the sun gear 380 is connected to the differential housing 364, i.e., the lever arm 372 connects tabs 376 and 378 and the planetary gear 114 will be locked and the gear ratio will be 1 to 1 without idling of the gear. This gear ratio of 1 to 1 is provided for in the high gear. When the operator selects the low range option the shift mechanism 368 will shift the shift arm 372 thus connecting tabs 376 and 374 to one another in effect connecting the sun gear 380 to the axle housing 344 and activating the planet gears 114. This makes the hollow gear 402 the input from the axle housing 314 and the planet carrier 412 the output which transfers the output to the axle differential carrier 118 which sends the output to the differential bevel gear set 390 providing for an achievable gear ratio of 1.7.

The double planetary gear system as shown in FIG. 4, will have the reduction gear 106 actuated where the shift arm 72 is removed such that the sun gear 80 locks with the axle housing 44, this means the planet gear carrier 112 will be connected to the differential housing 64 thus acting as input while the hollow gear 104 will act as output and drive the axle bevel gear differential 54. This arrangement will allow for an achievable gear ratio of approximately 2.2. It should also be noted that if the shift arm 72 is placed in a neutral position, i.e. only contacting tab 76 it can act as an axle disconnect device thus completely disconnecting the rear axle 20 from the all wheel drive system. Thus, in the high range the sun gear 80 is connected to the differential housing 64 which is the input and spins at the same speed as the differential housing. Thus, this allows for the basic torque split to be used in a rear axle 20.

FIG. 6 shows a graph of the tractive force versus the percent gradient in high and low range for a vehicle with a basic torque split of 60% front and 40% rear. As can be seen in the graph, when in the low range the torque split shifts predominantly to the rear, i.e., approximately 43% front and 57% back and the traction potential of the vehicle is significantly improved. It should be noted that this effect is even more pronounced if additional considerations are given to the dynamic weight redistribution that is found under acceleration. Therefore, the tractive force in low range, which is generally preferred by the operator of the vehicle, increases because of the predominately rear shift of the basic torque split when the low range gear is activated.

It should also be noted that a second alternate embodiment has been considered wherein the reduction gear would be arranged in front of the differential housing on the pinion shaft, which is spinning with the prop shaft speed, directly in front of the rear axle housing. It should also be noted that in the all wheel drive vehicle of the present invention, that only the rear side shafts have to be designed for maximum torque found in the low range while all of the other drive line components only have to be designed for the max engine torque as found in the high gear range of the all wheel drive vehicle. It also should be noted that a gear ratio of up to 2.7 may be achieved by a double planetary reduction gear setup. Therefore, with the invention being used on a full time all wheel drive system that has three open differentials it reduces the weight, packaging and design needs for a low range gear by allowing all of the drive line components in front of the reduction gear to remain the same while only having to change and design for maximum low end torque on the rear side shafts and the reduction gear system within the rear differential.

The present invention has been described in an illustrative manner, it is to be understood that the terminology which has been used is intended to be in the nature of words or description rather than of limitation.

Many modifications and variations of the present invention are possible in light of the above teachings. Therefore, within the scope of the appended claims, the present invention may be practiced otherwise than as specifically described.

What is claimed is:

1. An all wheel drive system for use in a vehicle, said system comprising:

a front axle having a front differential;

a center differential connected to said front differential; and a rear axle having a rear differential, said rear differential connected to said center differential, one of said axles having a reduction gear integrated therein, and a sun gear in contact with said reduction gear, said sun gear having a body portion with a plurality of teeth on both ends thereof.

2. The system of claim 1 wherein said rear axle includes an axle housing and a differential housing rotatably supported within said axle housing.

3. The system of claim 2 wherein said differential housing includes a differential gear set therein, said differential gear set provided adjacent to said reduction gear.

4. The system of claim 3 wherein a shift mechanism is provided adjacent to and slidingly engageable with said sun gear.

5. The system of claim 4 wherein said shift mechanism engages said differential housing.

6. The system of claim 4 wherein said shift mechanism engages said axle housing.

7. The system of claim 5 wherein said reduction gear is locked and provides a 1:1 gear ratio for a high gear.

8. The system of claim 6 wherein said reduction gear is actuated and provides a predetermined low range gear ratio.

9. The system of claim 1 wherein said reduction gear is a single planetary gear.

10. The system of claim 1 wherein said reduction gear is a double planetary gear.

* * * * *